(12) United States Patent
Bradshaw et al.

(10) Patent No.: US 8,332,518 B2
(45) Date of Patent: Dec. 11, 2012

(54) BIDIRECTIONAL COMMUNICATION PROTOCOL BETWEEN A SERIALIZER AND A DESERIALIZER

(75) Inventors: Peter D. Bradshaw, Sunnyvale, CA (US); Wei Wang, San Jose, CA (US); Paul D. Ta, Fremont, CA (US); Bill R-S Tang, San Jose, CA (US); Alvin Wang, Saratoga, CA (US)

(73) Assignee: Intersil Americas Inc., Milpitas, CA (US)

( * ) Notice: Subject to any disclaimer, the term of this patent is extended or adjusted under 35 U.S.C. 154(b) by 1226 days.

(21) Appl. No.: 11/838,064

(22) Filed: Aug. 13, 2007

(65) Prior Publication Data

US 2008/0040765 A1 Feb. 14, 2008

Related U.S. Application Data

(60) Provisional application No. 60/822,287, filed on Aug. 14, 2006, provisional application No. 60/862,001, filed on Oct. 18, 2006.

(51) Int. Cl.
*G06F 15/16* (2006.01)
(52) U.S. Cl. ........ 709/227; 348/536; 348/537; 348/538; 348/539; 348/540; 370/477; 370/478; 370/479; 370/480; 725/121
(58) Field of Classification Search .................. 709/227; 348/536–540; 370/477–480; 725/121
See application file for complete search history.

(56) References Cited

U.S. PATENT DOCUMENTS

| | | | |
|---|---|---|---|
| 6,020,901 A | | 2/2000 | Lavelle et al. |
| 6,914,637 B1 * | | 7/2005 | Wolf et al. .................. 348/473 |
| 7,440,702 B2 * | | 10/2008 | Imai ............................. 398/141 |
| 7,548,675 B2 * | | 6/2009 | Tatum et al. .................. 385/100 |
| 7,742,438 B1 * | | 6/2010 | Xu et al. ........................ 370/278 |
| 8,000,350 B2 * | | 8/2011 | Riedel et al. .................. 370/503 |
| 2003/0043142 A1 * | | 3/2003 | Ishibashi ....................... 345/213 |
| 2003/0169831 A1 * | | 9/2003 | Neugebauer et al. ......... 375/316 |
| 2004/0080523 A1 * | | 4/2004 | Myers ........................... 345/699 |
| 2004/0174466 A1 * | | 9/2004 | Kwon ............................ 348/705 |
| 2005/0219083 A1 * | | 10/2005 | Boomer et al. .............. 341/100 |
| 2006/0067690 A1 | | 3/2006 | Tatum |
| 2006/0179201 A1 * | | 8/2006 | Riedel et al. .................. 710/305 |
| 2006/0200585 A1 * | | 9/2006 | Weigert ......................... 709/249 |

(Continued)

FOREIGN PATENT DOCUMENTS

CN 1540913 10/2004

(Continued)

OTHER PUBLICATIONS

International Search Report for PCT Application No. PCT/US2007/075912, 4 pages.

(Continued)

*Primary Examiner* — Duyen Doan
(74) *Attorney, Agent, or Firm* — Fogg & Powers LLC

(57) ABSTRACT

A method provides a bidirectional communication protocol for data communication between a first device and a second device. The method includes: during a first time interval, transmitting data from the first device to the second device; and during a second time interval, (a) after the occurrence of a first event, (i) suspending data transmission from the first device to the second device; and (ii) transmitting control data from the second device to the first device; and (b) after the occurrence of a second event, transmitting control data from the first device to the second device.

45 Claims, 3 Drawing Sheets

U.S. PATENT DOCUMENTS

| | | | | |
|---|---|---|---|---|
| 2006/0227809 | A1* | 10/2006 | Miller | 370/471 |
| 2007/0009060 | A1* | 1/2007 | Lavelle et al. | 375/295 |
| 2007/0011552 | A1* | 1/2007 | Altmann | 714/746 |
| 2008/0317181 | A1* | 12/2008 | Suzuki et al. | 375/355 |

FOREIGN PATENT DOCUMENTS

| | | |
|---|---|---|
| EP | 1 416 687 A1 | 5/2004 |
| EP | 1 471 434 A1 | 10/2004 |
| WO | WO2005/091543 | 9/2005 |

OTHER PUBLICATIONS

Written Opinion of the International Searching Authority for PCT Application No. PCT/US2007/075912, 7 pages.

Chinese Patent Office, "Office Action", Jun. 10, 2011, Published in: CN.

Chinese Patent Office, "Second Office Action", Jun. 21, 2012, pp. 16, Published in: CN.

* cited by examiner

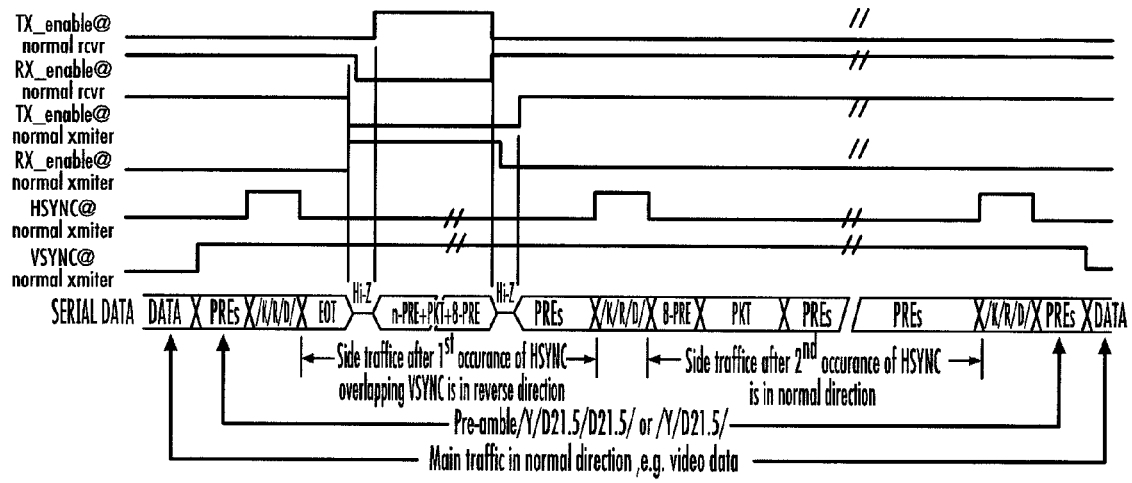

BIDIRECTIONAL TRAFFIC ON HIGH SPEED LINK WHEN VSYNC IS AT LEAST 2 LINES LONG

FIG. 2

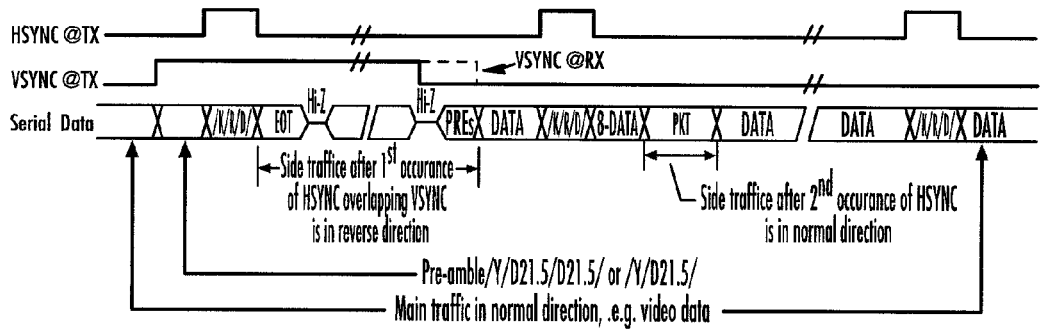

BIDIRECTIONAL TRAFFIC ON HIGH SPEED LINK WHEN VSYNC IS LESS THAN 2 LINES

FIG. 3

TABLE 4 DATA PACKET OF SIDE TRAFFIC

| 24-to-1 SERDES | | | | | | | |
|---|---|---|---|---|---|---|---|
| /S/Dev_id/R / | /S/Addr/R/ | /N/$D_0$/$D_1$/ | ... ... | /N/$D_k$/$D_k$+1/ | /T/Err/R | /T/CRC_LSB/R | /T/CRC_MSB/R |

| 16-to-1 SERDES | | | | | | | |
|---|---|---|---|---|---|---|---|
| /S/Dev_id/ | /S/Addr/ | /N/$D_0$/ | ... ... | /N/$D_k$/ | /T/Err/ | /T/CRC_LSB/ | /T/CRC_MSB/ |

FIG. 7

TABLE 5 SIDE TRAFFIC IN NORMAL DIRECTION

| CODE FOR 1ST HSYNC | 8 Pre-ambles or data | Data packet depicted in Table 4 | Data, or Pre-ambles to fill the gap | CODE FOR 2nd HSYNC |
|---|---|---|---|---|
| HSYNC=1 | HSYNC=0 | | | HSYNC=1 |

FIG. 5

TABLE 6 SIDE TRAFFIC IN REVERSE DIRECTION

| TRAFFIC IN NORMAL DIRECTION | TA | TRAFFIC IN REVERSE DIRECION | | | TA | TRAFFIC IN NORMAL DIRECION | |
|---|---|---|---|---|---|---|---|
| CODE FOR HSYNC: /K/R/R/ | 8 EOT PIXELS | m Hi-Z | n Pre-ambles | DATA PACKET DEPICTED IN TABLE 4 | 8 Pre-ambles | m Hi-Z | n Pre-ambles | Normal coding for data, DE and H/VSYNC |
| HSYNC=1 | HSYNC=0 | | | | | | HSYNC=1/0 |
| VSYNC=1 | VSYNC=1 | | | | | | VSYNC=1/0 |

FIG. 4

TABLE 2 SPECIAL CHARACTERS USED IN PROTOCOL

| SYMBOL | CODE GROUP NAME | OCTET VALUE | CURRENT RD− abcdei fghj | CURRENT RD+ abcdei fghj | Note |
|---|---|---|---|---|---|
| Y | K28.1 | 3C | 001111 1001 | 110000 0110 | COMMA |
| K | K28.5 | BC | 001111 1010 | 110000 0101 | COMMA |
| R | K23.7 | F7 | 111010 1000 | 000101 0111 | IDLE,FILLER... |
| S | K27.7 | FB | 110110 1000 | 001001 0111 | START OF PACKET |
| T | K29.7 | FD | 101110 1000 | 010001 0111 | END OF PACKET |
| V | K30.7 | FE | 011110 1000 | 100001 0111 | ERROR |

BIDIRECTIONAL COMMUNICATION PROTOCOL BETWEEN A SERIALIZER AND A DESERIALIZER

REFERENCE TO RELATED APPLICATIONS

The present application is related to and claims priority to (a) copending U.S. provisional patent application, entitled "Bidirectional Communication Protocol Between a Serializer and a Deserializer," Ser. No. 60/822,287, filed on Aug. 14, 2006; and (b) copending U.S. provisional patent application, entitled "Bidirectional Communication Protocol Between a Serializer and a Deserializer," Ser. No. 60/862,001, filed on Oct. 18, 2006. The disclosures of the copending provisional applications are hereby incorporated by reference in their entireties.

BACKGROUND OF THE INVENTION

1. Field of the Invention

The present invention relates to high speed data communication (e.g., 1 G-bit/second or higher). In particular, the present invention relates to a bidirectional data communication protocol for communicating between a serializer and a deserializer.

2. Discussion of the Related Art

Transmitting a multi-bit data word in parallel over a number of conductors is costly because each transmitted bit requires a transmitter and a receiver circuit, in addition to the many conductors in a parallel cable. In addition, the bits of the data word may arrive at the receiver skewed or delayed in time relative to each other. The data rate is therefore limited by any margin of error that must be provided to compensate for such skews. One method in the prior art to avoid the high cost of parallel data transmission serializes the parallel data at the transmitter into a single data stream and deserializes the data stream back into parallel data at the receiver. In many applications, a small amount of control information (relative to the data transmitted) may still be required from the receiver. The cost savings of serialization is partly offset by providing a separate channel for sending such control information in the opposite direction.

SUMMARY OF THE INVENTION

According to one embodiment of the present invention, a method for providing a bidirectional communication protocol between a first device and a second device includes: during a first time interval, transmitting data from the first device to the second device; and during a second time interval, (a) after the occurrence of a first event, (i) suspending data transmission from the first device to the second device; and (ii) transmitting control data from the second device to the first device; and (b) after the occurrence of a second event, transmitting control data from the first device to the second device.

According to one embodiment of the present invention, the method for providing the bidirectional communication protocol is implemented between a data source and a data sink. In one implementation, the data source may be a video data source, such as a DVD player, and the data sink may be a video display.

The present invention is better understood upon consideration of the detailed description below and the accompanying drawings.

BRIEF DESCRIPTION OF THE DRAWINGS

FIG. 2 shows the timing of the control data flow and the content of the serial data transmitted, according to this embodiment of the present invention.

FIG. 3 shows the timing of the control data flow and the content of the serial data transmitted, in accordance with the present embodiment of the present invention.

FIG. 4 includes Table 6, which shows the control data flow during the first H_SYNC interval.

FIG. 5 includes Table 5, which shows the control data flow during the second H_SYNC interval.

FIG. 6 includes Table 2, which defines a number of special characters.

FIG. 7 includes Table 4 which shows the formats of the data packet for the 16-to-1 and 24-to-1 modes.

DETAILED DESCRIPTION OF THE PREFERRED EMBODIMENTS

Figure 1:
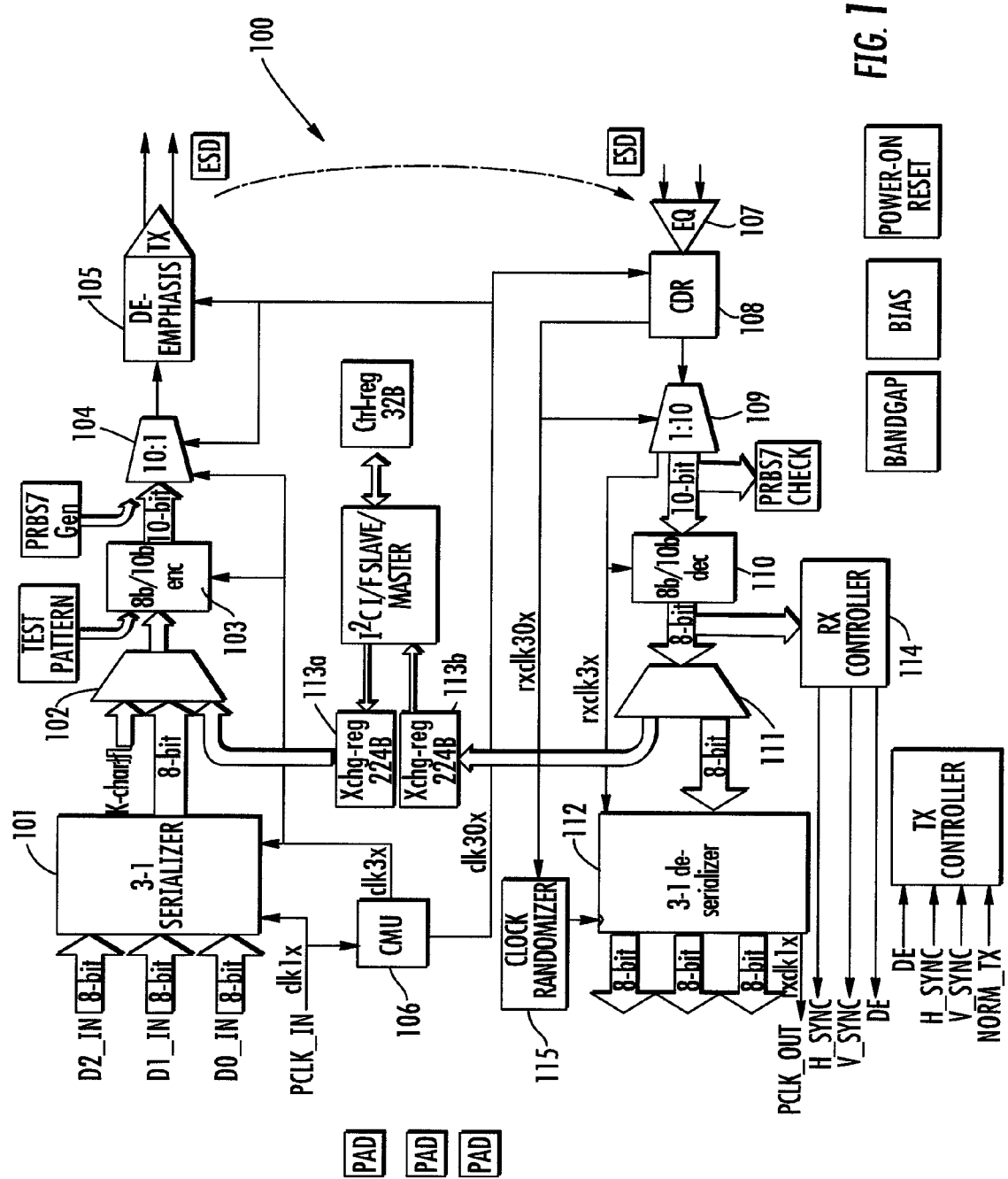
FIG. 1 shows serializer/deserializer circuit 100 which is an exemplary circuit suitable for implementing a bidirectional communication protocol according to one embodiment of the present invention.

The present invention provides a bidirectional communication protocol between a serializer and a deserializer, sending data and control information in both directions over the same serial communication channel.

One application of the present application may be data transmission between a video decoder (e.g., a DVD player) and a video display system (e.g., an LCD monitor). FIG. 1 shows serializer/deserializer circuit 100 which is an exemplary circuit suitable for implementing a bidirectional communication protocol according to one embodiment of the present invention. In the application between the video decoder and the video display system, a copy of serializer/deserializer circuit 100 may be provided at each end. The serializer/deserializer circuits are then connected by a single serial cable. In this application, the serializer is the transmitter for video data ("main traffic") for the majority of the time, and the de-serializer is the receiver of the main traffic for that majority of the time. In other words, the video decoder is the serializer and the display system is the deserializer. However, during the remaining time, blocks of control data alternately flows between the video decoder and the display system.

As shown in FIG. 1, serializer/deserializer circuit 100 includes 3-1 serializer circuit 101, which serializes three 8-bit parallel data streams into a single 3× 8-bit parallel data stream at 3 times the data rate of the input data streams. The three input data streams may be, for example, three video data streams for driving three or more graphical displays (e.g., LCD monitors). The three input data streams may also be the three-color pixel data (e.g., red, green and blue, or magenta, yellow and cyan) for a single 24-bit color display. Multiplexer 102 may select, in addition to the 3× 8-bit data stream from 3-1 serializer circuit 101, one or more additional 8-bit data streams (e.g., video data control signals and a control data stream) for transmission. Video data control signals may include V_SYNC (vertical synchronization), H_SYNC (horizontal synchronization) and DE (display enable). The selected 8-bit data stream from multiplexer 102 is encoded in 8/10-bit encoder 103, using an 8/10b coding scheme for serial data transmission known to those skilled in the art. 8-bit test data may be injected into the data stream at 8/10-bit encoder 103. The 10-bit encoded data is serialized in serializing circuit 104 for transmission by transmitter 105 into the communication channel (i.e., the serial cable). In this embodiment, as in many high speed communication schemes, the communication channel may use low voltage differential signaling (LVDS). Transmission circuit 105 may include a pre-emphasis circuit to shape the output waveform to compensate anticipated distortion in the communication channel. Management unit 106 provides the necessary 1×, 3× and 30× system clock signals.

Serializer/deserializer circuit 100 includes a receiver circuit for receiving data in the reverse direction from the communication channel. The receiver circuit includes equalizer 107, which further compensates for distortion in the communication channel. Clock recovery circuit 108 recovers the 30× system clock signal, which is used to provide the 1×, 3× and 30× clock signals used in the receiver circuit. The received serial data stream is deserialized in deserializer 109 into a 10-bit data stream, which is decoded by 8/10b decoder 110 according to the coding scheme back to an 8-bit data stream. From this decoded 8-bit data stream (at three times data rate), demultiplexer 111 recovers the 3× 8-bit data stream and the control data stream. The video data control signals (i.e., V_SYNC, H_SYNC and DE) are also recovered from special characters in the 10-bit encoded data stream by receiver controller 114. The individual input 8-bit data streams are recovered in 3-1 deserializer 112 from the 3× 8-bit data stream. Clock randomizer circuit 115 modulates the individual data signals and the 1× clock signal to reduce electromagnetic interference (EMI). The control data to be transmitted and the control data received are stored respectively in registers 113a and 113b respectively. The control data may originate from or be directed to devices attached to an I²C interface bus.

In the above description, serializer/deserializer circuit 100 operates in a 24-to-1 mode (i.e., serializing three 8-bit data streams). Serializer/deserializer circuit 100 may also operate in a 16-to-1 data mode. Data may be grouped under either mode in units of "pixel". Under 24-to-1 mode, each pixel consists of three 8-bit bytes encoded to three 10-bit characters, and under 16-to-1 mode, each pixel consists of two 8-bit bytes encoded to two 10-bit characters.

According to one embodiment of the present invention, control data are exchanged between the serializer and the deserializer during the time when V_SYNC is active. V_SYNC is normally active for at least two H_SYNC intervals—each interval being the time between H_SYNC pulses. The first H_SYNC interval during a V_SYNC active period is provided for sending control data from the deserializer to the serializer (i.e., in the reversed direction from the main traffic) and the second H_SYNC interval in the V_SYNC period is provided for sending control data from the serializer to the deserializer (i.e., in the direction of the main traffic). FIG. 2 shows the timing of the control data flow and the content of the serial data transmitted, according to this embodiment of the present invention.

In the event of a premature termination of the V_SYNC active period (i.e., the V_SYNC active period lasting less than 2H_SYNC intervals), the control information is still exchanged as if the V_SYNC active period lasts two H_SYNC intervals. In this situation, some data in the main traffic may be lost. In this instance, the deserializer maintains V_SYNC high for the two H_SYNC intervals, providing substitute values (e.g., zero) for the data in the main traffic. FIG. 3 shows the timing of the control data flow and the content of the serial data transmitted, in accordance with the present embodiment of the present invention.

As shown in FIG. 2, during the V_SYNC active period, after the first H_SYNC pulse is deasserted, the serializer sends out four end-of-transmission (EOT) symbols (8 pixels) to signal to the deserializer that the serializer's transmitter is entering high impedance mode and begins to receive. On the deserializer side, upon receiving the EOT symbols, the deserializer waits for the receiving data to fail before turning off its receiver circuit. The deserializer then waits for a programmable number m of pixel periods before enabling its transmitter circuit for transmitting the control data. The data transmission from the deserializer consists of a data packet, preceded by a programmable number n of preamble symbols (each one pixel length), and succeeded by eight preamble symbols. Upon completion of transmission by the deserializer, the serializer waits for m pixel periods before reacquiring the communication channel. The deserializer sends out preamble symbols until the second H_SYNC interval during the present V_SYNC period is indicated by arrival of the second H_SYNC pulse. The control data flow during this first H_SYNC interval is shown in Table 6 of FIG. 4.

In the second H_SYNC interval during the active V_SYNC period, control data from the serializer is sent to the deserializer. This control data consists of a data packet which is preceded by eight preamble symbols and followed by as many preamble symbols as required until the end of the second H_SYNC interval, as indicated by the arrival of the next H_SYNC pulse. The control data flow during this second H_SYNC interval is shown in Table 5 of FIG. 5.

As shown in FIG. 3, if the V_SYNC signal becomes inactive (i.e., before the end of either the first or the second H_SYNC interval), the control data exchange is still performed.

In this embodiment, the preamble symbol, the end of transmission symbol, and the data packet use a number of special characters defined in Table 2 of FIG. 6. The preamble symbol includes a comma character /Y/, followed by one or two /D21.5/ characters, depending on whether 16-to-1 mode or 24-to-1 mode is used. The end-of-transmission symbol consists of two identical pixels, each pixel including the character /Y/ followed by one or two /D2.2/ characters. The data packet begins a start-of-packet (SOP) field, which consists of two pixels each including an /S/ character and destination information. The first pixel of the SOP field consists of the /S/ character followed by a device identifier (on the I²C interface) and the second pixel of the SOP field consists of the /S/ character, followed by the memory address at which the data packet is to be placed. The data packet ends with an end-of-packet (EOP) field, which consists also of two pixels. The first pixel of the EOP field consists of the /T/ character and the least significant byte of a cyclic redundancy check (CRC) checksum. The second pixel of the EOP field consists of the /T/ character and the most significant byte of the CRC checksum. An /R/ character is included in each pixel in the 24-to-1 mode. The formats of the data packet for the 16-to-1 and 24-to-1 modes are shown in Table 4 of FIG. 7.

The detailed description above is provided to illustrate the specific embodiments of the present invention and is not intended to be limiting. Numerous variations and modifications within the scope of the present invention are possible. The present invention is set forth in the following claims.

We claim:

1. A method for providing a bidirectional communication protocol between a first device and a second device, comprising:
generating a serial data stream from a parallel data stream;
during a first time interval, transmitting the serial data stream from the first device to the second device over a point-to-point communication link; and
during a second time interval, (a) after transmitting a first horizontal synchronization pulse to the second device,
(i) suspending transmitting the serial data stream from the first device to the second device; and (ii) transmitting first control data, including error data, from the second device to the first device over the point-to-point communication link; and (b) after transmitting a second, consecutive horizontal synchronization pulse to the second device, transmitting second control data from the first device to the second device.

2. A method as in claim 1, wherein the data transmitted comprises video data expressed according to a predetermined data format, wherein the transmitting the first horizontal synchronization pulse comprises sending of a timing signal from the first device to the second device.

3. A method as in claim 2, wherein the timing signal comprises a horizontal synchronization pulse for a video display.

4. A method as in claim 3, wherein the transmitting the second horizontal synchronization pulse occurs at a predetermined time relative to occurrence of the transmitting the first horizontal synchronization pulse.

5. A method as in claim 4, wherein the transmitting the second horizontal synchronization pulse occurs after a time interval corresponding to the time interval between successive horizontal synchronization pulses.

6. A method as in claim 1, wherein transmission of the first control data from the second device occurs after a predetermined time period following suspending transmitting data from the first device to the second device.

7. A method as in claim 6, wherein the predetermined time period is programmable.

8. A method as in claim 7, wherein suspending transmitting data from the first device is signaled by the first device sending a plurality of end-of-transmission control characters.

9. A method as in claim 7, wherein transmission of the second control data from the first device occurs after a predetermined time period following suspending transmitting the first control data from the second device to the first device.

10. A method as in claim 1, wherein the first control data transmitted from the second device to the first device is preceded by a start symbol, followed by a plurality of preamble symbols.

11. A method as in claim 1, wherein transmitting the first control data from the second device to the first device provides the first control data in a data packet with a predetermined format.

12. A method as in claim 1, further comprising resuming transmission of data from the first device to the second device following the second time interval.

13. A data source, comprising:
a transmitter for transmitting data to a data sink over a point-to-point communication link;
a receiver for receiving data from the data sink over the point-to-point communication link; and
a controller that (a) during a first time interval, enables the transmitter to send data to the data sink; and (b) during a second time interval, (I) after transmitting a first horizontal synchronization pulse to the data sink, (i) suspends data transmission to the data sink; and (ii) after a predetermined delay, enables the receiver to receive first control data, including error data, from the data sink over the point-to-point communication link; and (II) after transmitting a second, consecutive horizontal synchronization pulse to the data sink, transmits second control data to the data sink.

14. A data source as in claim 13, wherein the data source comprises a video data source transmitting video data expressed according to a predetermined data format, wherein the data sink comprises a video display, and wherein the transmitting the first horizontal synchronization pulse comprises sending of a timing signal from the video source to the video display.

15. A data source as in claim 14, wherein the timing signal comprises a horizontal synchronization pulse transmitted concurrently with a portion of a vertical synchronization pulse.

16. A data source as in claim 15, wherein the transmitting the second horizontal synchronization pulse occurs at a predetermined time relative to occurrence of the transmitting the first horizontal synchronization pulse.

17. A data source as in claim 15, wherein the transmitting the second horizontal synchronization pulse occurs after a time interval corresponding to the time interval between successive horizontal synchronization pulses.

18. A data source as in claim 13, wherein the controller signals suspension of data transmission to the data sink by enabling the transmitter to transmit a plurality of end-of-transmission control characters.

19. A data source as in claim 13, wherein the first control data received from the data sink is preceded by a start symbol, followed by a plurality of preamble symbols.

20. A data source as in claim 13, further comprising a serializer for serializing parallel data prior to transmission by the transmitter.

21. A video data source, comprising:
a serializer for serializing video data provided in a parallel format;
a transmitter transmitting the serialized video data to a video display;
a receiver for receiving first control data from the video display; and
a controller that (a) during a first time interval, enables transmission of the serialized video data to the video display; and (b) during a second time interval, (I) after transmitting a first horizontal synchronization pulse to the video display, (i) suspends serialized video data transmission; and (ii)
after a predetermined time period, enables the receiver to receive the first control data from the video display; and (II)
after transmitting a second, consecutive horizontal synchronization pulse to the video display, (i) enables the transmitter to transmit second control data to the video display; and (ii)
upon completion of transmission of the second control data to the video display, enables the transmitter to resume transmitting serialized video data to the video display.

22. A video data source as in claim 21, wherein the first control data from the video display is received during one horizontal synchronization pulse interval.

23. A video data source as in claim 21, wherein the predetermined time period is programmable.

24. A video data source as in claim 21, wherein suspending transmitting data from the first device is signaled to the video display by the transmitter transmitting a plurality of end-of-transmission control characters.

25. A video source as in claim 24, wherein the first control data transmitted from the video display is preceded by a start symbol, followed by a plurality of preamble symbols.

26. A data sink, comprising:
a transmitter for transmitting data to a data source over a point-to-point communication link;
a receiver for receiving data from the data source over the point-to-point communication link; and
a controller that (a) during a first time interval, enables the receiver to receive data from the data source; and (b)

during a second time interval, (I) after receiving a first horizontal synchronization pulse from the data source, (i) suspends data reception from the data source; and (ii) after a predetermined delay, enables the transmitter to transmit first control data, including error data, from the data sink; and (II) upon receiving a second, consecutive horizontal synchronization pulse from the data source, receives second control data from the data source.

27. A data sink as in claim 26, wherein the data source comprises a video data source transmitting video data expressed according to a predetermined data format, wherein the data sink comprises a video display, and wherein the receiving the first horizontal synchronization pulse comprises sending of a timing signal from the video source to the video display.

28. A data sink as in claim 27, wherein the timing signal comprises a horizontal synchronization pulse transmitted concurrently with a portion of a vertical synchronization pulse.

29. A data sink as in claim 27, wherein the receiving the second horizontal synchronization pulse occurs at a predetermined time relative to occurrence of the receiving the first horizontal synchronization pulse.

30. A data sink as in claim 27, wherein the receiving the second horizontal synchronization pulse occurs after a time interval corresponding to the time interval between successive horizontal synchronization pulses.

31. A data sink as in claim 26, wherein the controller detects a plurality of end-of-transmission control characters and thereupon, suspends data reception from the data source.

32. A data sink as in claim 26, wherein the controller signals transmitting the first control data to the data source by transmitting a start symbol, followed by a plurality of preamble symbols.

33. A video display, comprising:
a receiver receiving video data from a video data source provided in a serial format;
a deserializer for deserializing video data into a parallel video data format;
a transmitter for transmitting control data to the video data source; and
a controller that (a) during a first time interval, enables reception of the serial video data from the video data source; and (b)
during a second time interval, (I) upon receiving a first horizontal synchronization pulse from the video data source, (i) suspends receiving the video data; and (ii) after a predetermined time period, enables the transmitter to transmit first control data to the video data source; and (II)
upon receiving a second, consecutive horizontal synchronization pulse from the video data source, (i) enables the receiver to receive second control data from the video data source; and the serialized video data from the video data source.

34. A video display as in claim 33, wherein the first control data from the video display is received during one horizontal synchronization pulse interval.

35. A video display as in claim 33, wherein the predetermined time period is programmable.

36. A video display as in claim 33, wherein the controller suspends reception of video data from the video source upon receiving a plurality of end-of-transmission control characters.

37. A video display as in claim 33, wherein the first control data transmitted from the video display is preceded by a start symbol, followed by a plurality of preamble symbols.

38. A system comprising:
a data source;
a data sink; and
a bi-directional, point-to-point communication link coupled between the data source and the data sink;
wherein the data source, includes:
a transmitter for transmitting data to the data sink over the point-to-point communication link;
a receiver for receiving data from the data sink over the point-to-point communication link; and
a controller that (a) during a first time interval, enables the transmitter to send data to the data sink; and (b) during a second time interval, (I) after transmitting a first horizontal synchronization pulse to the data sink, (i) suspends data transmission to the data sink; and (ii) after a predetermined delay, enables the receiver to receive first control data, including error data, from the data sink over the point-to-point communication link; and (II) after transmitting a second, consecutive horizontal synchronization pulse to the data sink, transmits second control data to the data sink; and
wherein the data sink, includes:
a transmitter for transmitting data to a data source over a point-to-point communication link;
a receiver for receiving data from the data source over the point-to-point communication link; and
a controller that (a) during the first time interval, enables the receiver to receive data from the data source; and (b) during the second time interval, (I) after the occurrence of the transmitting the first horizontal synchronization pulse, (i) suspends data reception from the data source; and (ii) after the predetermined delay, enables the transmitter to transmit the first control data, including error data, from the data sink; and (II) after the occurrence of the transmitting the second, consecutive horizontal synchronization pulse, receives the second control data from the data source.

39. A system as in claim 38, wherein the data source comprises a video data source transmitting video data expressed according to a predetermined data format.

40. A system as in claim 38, wherein the data source comprises a video data source transmitting video data expressed according to a predetermined data format, and the video sink comprises a video display.

41. A system as in claim 38, wherein the data source comprises a video data source transmitting video data expressed according to a predetermined data format, the video sink comprises a video display, and the transmitting the first horizontal synchronization pulse comprises sending of a timing signal from the video data source to the video display.

42. A system as in claim 38, wherein the transmitting the second horizontal synchronization pulse occurs at a predetermined time relative to occurrence of the transmitting the first horizontal synchronization pulse.

43. A system as in claim 41, wherein the timing signal comprises a horizontal synchronization pulse transmitted concurrently with a portion of a vertical synchronization pulse.

44. A system as in claim 42, wherein the predetermined time period is programmable.

45. A system as in claim 43, wherein the transmitting the second horizontal synchronization pulse occurs after a time interval corresponding to the time interval between successive horizontal synchronization pulses.

* * * * *